UNITED STATES PATENT OFFICE.

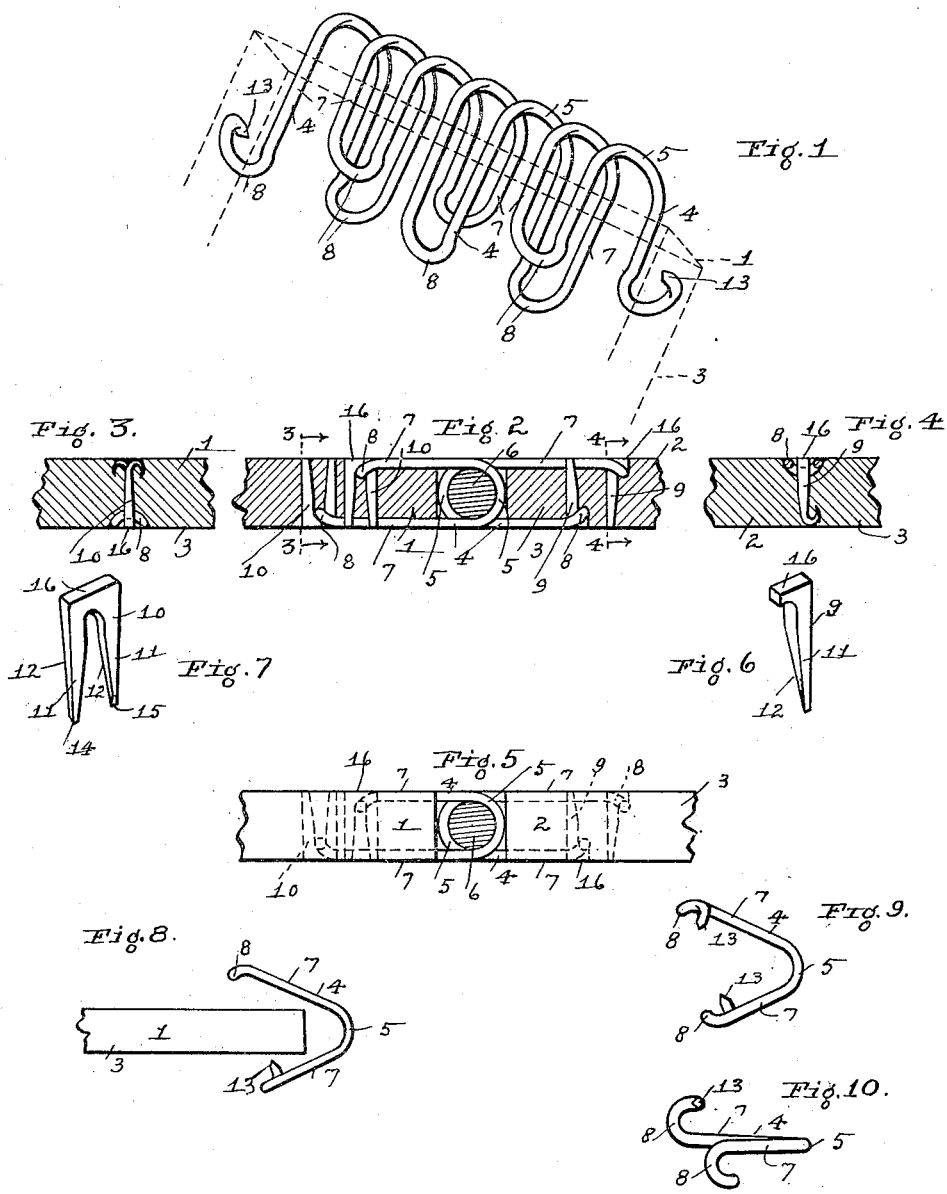

JAMES K. DIAMOND, OF GRAND RAPIDS, MICHIGAN, ASSIGNOR TO CLIPPER BELT LACER COMPANY, OF GRAND RAPIDS, MICHIGAN, A CORPORATION OF MICHIGAN.

DEVICE FOR JOINING THE ENDS OF BELTS.

1,257,954.  Specification of Letters Patent.  Patented Feb. 26, 1918.

Application filed May 14, 1917.  Serial No. 168,365.

*To all whom it may concern:*

Be it known that I, JAMES K. DIAMOND, a citizen of the United States, residing at Grand Rapids, in the county of Kent and State of Michigan, have invented new and useful Improvements in Devices for Joining the Ends of Belts, of which the following is a specification.

The present invention relates to devices for joining the ends of a belt; and its object is generally, to provide an improved device of that character which shall be simple in construction and very efficient in securely joining the belt's ends; and more particularly, such a device all of whose parts shall lie within the surface planes of the belt to which it is applied; and further, to provide improved fastening means for securing the connecting members to the belt.

These and any other objects appearing hereinafter are attained by, and the invention finds preferable embodiment in, the device hereinafter described and illustrated by the accompanying drawings, in which:

Figure 1 is a view in perspective of a gang of connecting members formed of a continuous wire; the position of the end of the belt to which they are applied being shown in dotted lines;

Fig. 2 is a longitudinal section of the ends of a belt showing the manner in which such members are fastened thereto;

Fig. 3 is a transverse section of a portion of the same taken on line 3—3 of Fig. 2;

Fig. 4 is a like sectional view taken on line 4—4 of Fig. 2;

Fig. 5 is an edgewise view of the joined ends of a belt illustrating the manner of such joining;

Fig. 6 is a view in perspective of a fastener for securing the connecting member to the belt;

Fig. 7 is a like view of a modified construction of such a fastener;

Fig. 8 is a side view of the gang of connecting members before being applied to the end of the belt;

Fig. 9 is a side view of a single connecting member; and

Fig. 10 is a top view of the same.

The ends 1, 2 of the belt 3 are joined by means of connecting members 4 preferably formed of a continuous wire in gangs as shown in Fig. 1. One set or gang of said members is securely fastened to one end of the belt and a corresponding set or gang to the other end of the belt, the projecting loop portions 5 of one set interlacing with the loop portions of the other set: a suitable pin 6 being inserted into the interlaced loop portions joins the ends of the belt together. In order that the belt may run smoothly over the pulleys the arms 7 of the connecting members are embedded in the belt as shown. The ends of the arms are provided with bights 8, which in the gang construction illustrated connect the plurality of connecting members together in spaced parallel relation, one bight in such construction being common to arms of adjacent connecting members. Suitable fasteners 9, 10 are driven into the belt over the bights, and are clenched by the turning over of their points, as shown, in order to securely anchor the connecting members to the belt. These fasteners may be single-pronged as 9, or double-pronged as 10: In the latter case, their points are turned in opposite directions as illustrated in Fig. 3, to provide a more secure and more extended anchorage, such opposite turning being automatically effected by the opposite beveling of their points 14, 15, as shown in Fig. 7. The opposite sides 11, 12 of these fasteners converge toward their points, and in the driven-in position of the fasteners, said sides are parallel to the side edges of the belt: When the points of the double prongs are turned over oppositely and toward said edges of the belt they provide an anchorage less liable to pull out or to tear the belt than if these prongs were turned and clenched in a line in the lengthwise direction of the belt. The bights are turned inwardly *i. e.* the bights of the arms lying on one side of the belt are turned toward the bights of the arms on the other side of the belt, as illustrated. These bights (as well as the arms) are embedded in the belt deeply enough, as by sufficient pressure, that the heads 16 of the fasteners when driven in over the bights are likewise thus embedded as shown, so that no parts of the device extend above or outside the surface planes of the belt's sides. Such embedding of the inwardly-turned bights affords additional anchorage for the connecting members to prevent their pulling out, which end is also furthered by arranging short and long arms on each side of the belt alternately as shown. It will be seen that by reason of this inwardly-turning of the bights, the strain of the arms is not directly transverse to the fasteners, but is oblique thereto, said strain not being entirely such as to tend to break the fasteners off but partially to pull them out. This division of strain, partly transverse and partly longitudinal of the fasteners, affords a more secure anchorage for the connecting members than if such strain was entirely one way or the other. The ends of the wire may be provided with spurs 13, as shown, adapted to be driven into the belt.

The connecting members may be formed separately as shown in Figs. 9 and 10, each arm 7 having at its end an inwardly-turned bight 8.

I claim:

1. In a device of the character described for joining the ends of a belt; a plurality of connecting members, formed of continuous wire, each comprising arms and an intermediate loop portion, the ends of the arms having inwardly-turned bights; and fasteners driven into the belt over the bights.

2. In a device of the character described for joining the ends of a belt; a connecting member comprising arms and an intermediate loop portion, the ends of the arms having bights; and fasteners driven into the belt over the bights.

3. In a device of the character described for joining the ends of a belt; a connecting member comprising arms and an intermediate loop portion, the ends of the arms having inwardly-turned bights; and fasteners driven into the belt over the bights.

4. In a device of the character described for joining the ends of a belt; a connecting member comprising arms and an intermediate loop portion, the ends of the arms having bights; and double-pronged fasteners driven into the belt over the bights.

5. In a device of the character described for joining the ends of a belt; a connecting member comprising arms and an intermediate loop portion, the ends of the arms having bights; and double-pronged fasteners driven into the belt over the bights, the prongs being clenchingly turned oppositely.

6. In a device of the character described for joining the ends of a belt; a connecting member comprising arms and an intermediate loop portion, the ends of the arms having bights; and double-pronged fasteners having opposite sides converging toward their points and driven into the belt over the bights, said sides being parallel to the side edges of the belt in such driven position of the fasteners, and the points being clenchingly turned oppositely.

In testimony whereof I have hereunto set my hand at Grand Rapids, Michigan, May 10, 1917.

JAMES K. DIAMOND.

Copies of this patent may be obtained for five cents each, by addressing the "Commissioner of Patents, Washington, D. C."